April 13, 1948.　　　A. T. NABSTEDT　　　2,439,611
AXIALLY ENGAGING FRICTION CLUTCH
Filed Aug. 29, 1944　　　2 Sheets-Sheet 1
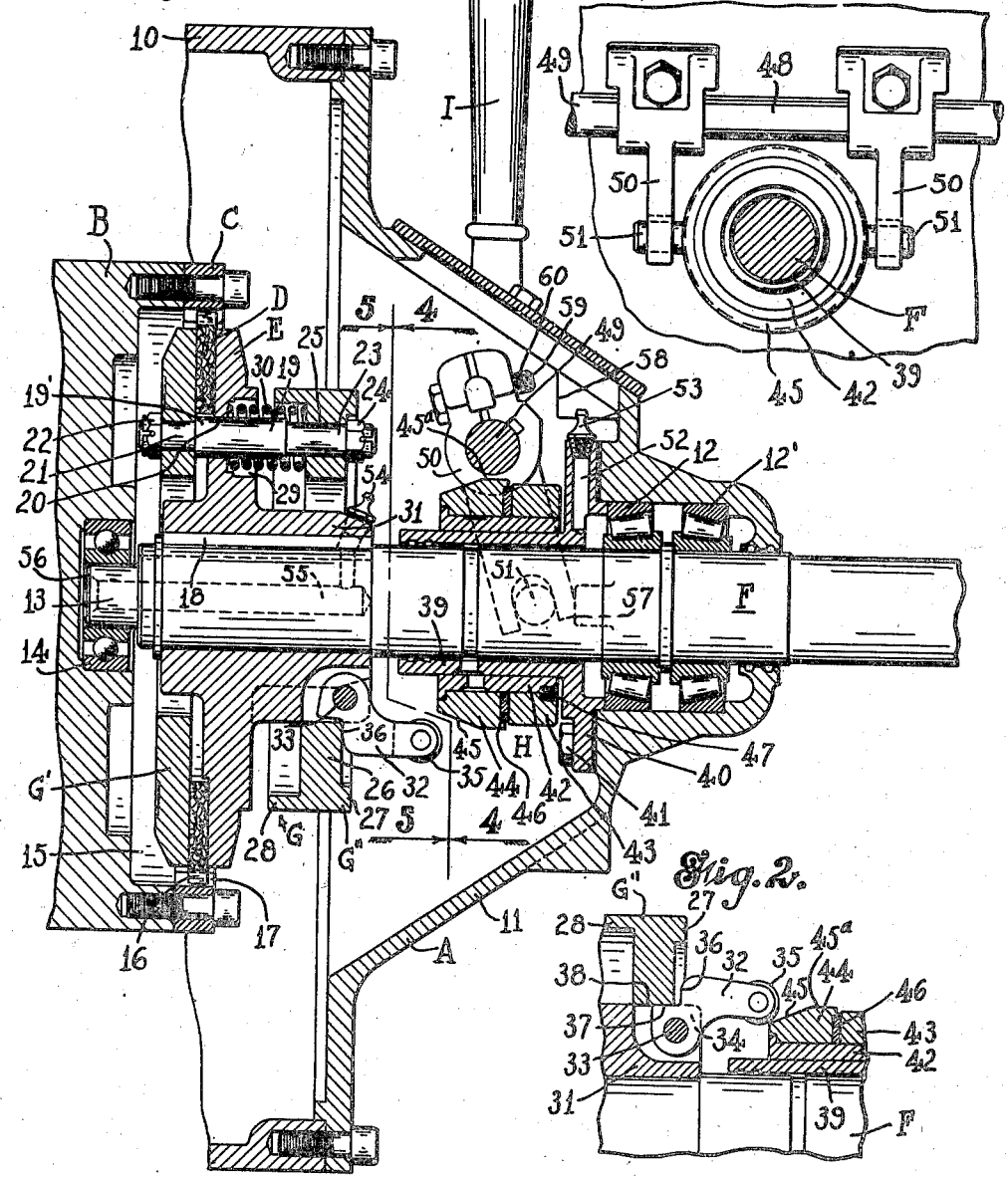
Inventor
Arthur T. Nabstedt
By Roswell Bartholow
Attorneys Inventor
Arthur T. Nabstedt
By Rockwell & Bartholow
Attorneys Patented Apr. 13, 1948

2,439,611

UNITED STATES PATENT OFFICE 2,439,611

AXIALLY ENGAGING FRICTION CLUTCH

Arthur T. Nabstedt, Hamden, Conn., assignor to The Snow-Nabstedt Gear Corporation, New Haven, Conn., a corporation of Connecticut Application August 29, 1944, Serial No. 551,653

8 Claims. (Cl. 192—68)

This invention relates to clutch mechanism and more particularly to friction disk clutches of the spring-loaded type.

One of the objects of the invention is to reduce the number of parts and especially the parts that are subject to wear and to provide a very simple and accessible clutch which operates very effectively.

Another object is to provide an improved arrangement of the principal parts of a friction clutch of the disk type in which oppositely placed plate members are normally held by springs in engagement with an interposed friction disk.

A further object is to provide improved means whereby a clutch of the kind just mentioned is released and, when desired, permitted to re-engage.

To these and other ends the invention consists in the novel features and combinations of parts to be hereinafter described and finally pointed out in the claims.

In the accompanying drawings:

Fig. 1 is a vertical longitudinal section of a clutch embodying my improvements showing the same in the engaged position;

Fig. 2 is a detail section illustrating the action of one of the cam levers;

Fig. 5 is a fragmentary section on line 5—5 of Fig. 1.

Figure 3:
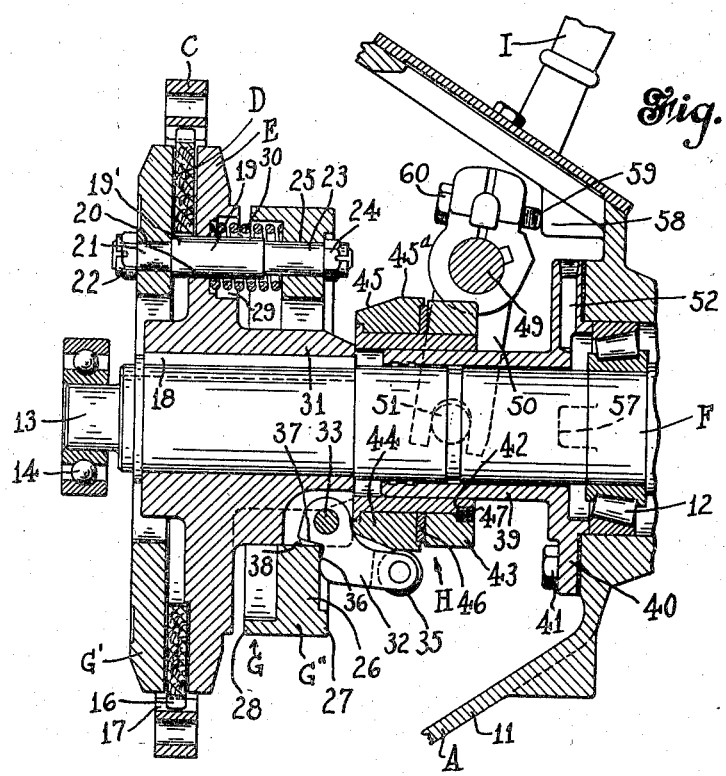
Fig. 3 is a vertical longitudinal section showing the position of the parts when the clutch is released.
Figure 4:
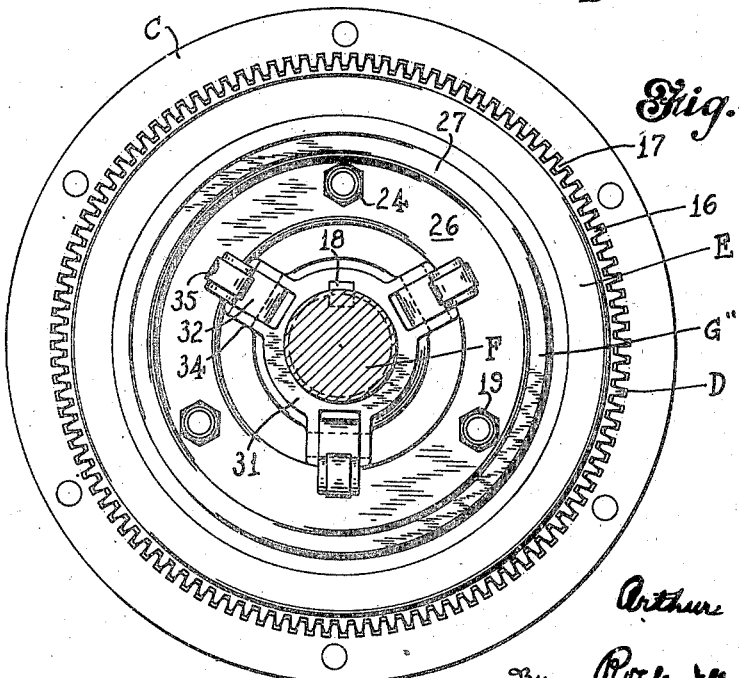
Fig. 4 is a section on line 4—4 of Fig. 1.

In the embodiment of the invention selected for illustration, the clutch is of a kind which may be advantageously employed between the fly wheel of an engine, for example an internal combustion engine, and a shaft which is in line with the engine shaft. The shaft to be driven has fixed to one end portion thereof a driving plate, and an axially movable driving plate is adapted to clamp between it and the first driving plate a friction disk of fibrous material, which friction disk is interlocked at its peripheral portion with a driving ring attached to and moving with the fly wheel. The second mentioned plate constitutes one member of a duplex element or cage enclosing the first mentioned plate, and having a second principal member in the nature of a presser member at the opposite side of the first plate connected to the first plate member by spacing elements in the nature of bolts surrounded by helical springs which load the clutch in the manner hereinafter described and which normally hold the second member of the duplex element or cage in a predetermined axial position. The clutch is normally held in the operating position by the loading springs just referred to, but when it is desired to release it, axial pressure exerted upon a throwout collar is applied to the presser member of the cage for the purpose of moving the first or plate member of the cage to disengaging position as hereinafter described. The throwout collar may be actuated by suitable means such as a lever handle located at one side of the clutch housing.

In the drawings, the clutch housing is indicated at A, the engine fly wheel at B, the driving ring at C, and the friction disk at D. The axially fixed plate member E is carried at one end of the driven shaft F, and the duplex element or cage previously referred to, cooperating with the parts D and E, is indicated generally at G, the same including a forward plate member G' and a rearwardly located member G". The throwout collar is generally indicated at H and the operating lever therefor at I.

Referring to the details, it will be noted that in the embodiment shown, the housing A has a cylindrical portion 10 and a rearward tapering portion 11, the latter portion being equipped with anti-friction bearings 12, 12' for the shaft F. At the forward extremity of the shaft F, the latter has a reduced extremity 13 engaged in an anti-friction bearing 14 with which the fly wheel B is provided. The fly wheel has a recess 15 at its rear face in which the plate member G' operates. The friction disk D is made of suitable fibrous material and is capable of axial movement, the said disk being provided at the periphery with teeth 16 engaged in the spaces between teeth 17 formed on the inner part of driving ring C. The clutch plate E is keyed to the shaft F by means of a key 18.

The plate member G' is connected to the member G" by means of a number of bolt-like members 19, three of such members being employed in this instance. One of such bolt-like members is shown in Fig. 1, and it will be noted that it comprises a body portion 19' passing through an aperture 20 in member E, and providing at the forward end of said portion 19' a shoulder abutting the rear face of member G'. In front of portion 19' a reduced portion 21 extends through a round opening in member G', and to the forward end of portion 21 a castellated nut 22 is applied for the purpose of holding member G' firmly in place on the forward end portion of the bolt-like member or spacer 19. Rearwardly of the portion 19' the bolt-like member or spacer is provided with a cylindrical portion 23 of reduced diameter on the rear end of which is a castellated nut 24. The portion 23 engages a round hole 25 in the member G''. The member G'' has a web portion 26, a rearwardly extending rim portion 27, and a forwardly extending rim portion 28.

At the rear face of the member E and at points in line with the apertures 29, said member is provided with readwardly facing sockets 29, and located in these sockets are the forward ends of helical springs 30 which serve the purpose of loading the clutch. The forward extremities of these springs, which are compression springs, engage the member E at the rear, and the rear extremities of these springs engage the front face of the web 26 of the member G''. Each spring 30 is located around a bolt member 19, and normally, the springs by pressing in opposite directions against the members E and G'' hold the plate G' against the disk D and the disk D against the member E.

It will be noted that when the parts are in the position shown in Fig. 1, the body portion 19' of each bolt member has some space left between it and the forward face of member G'', for a purpose mentioned later on.

For the purpose of providing for the disengagement of the clutch by forward axial movement of the member G'' and by forward movement of the throwout collar H, suitable means are provided, and these means preferably comprise a number of levers (preferably three) pivoted on hub 31 of the member E and adapted to be rocked by throwout collar H so as to force the member G'', and thereby the member G', in a forward or releasing direction. In the form shown, the levers referred to are indicated at 32 and each of them is pivoted by means of a pivot pin 33 in a lug 34 formed on the rear end portion of the hub 31. The forward end of the lever is pivoted to the hub so as to swing relatively thereto, and the rear end of the lever is provided with a roller 35 adapted to be engaged by the throwout collar as hereinafter described. Each lever 32 is provided between its extremities and at its outer part (with relation to the axis of shaft F) with a shoulder 36, and this shoulder is adapted to engage the rear face of web 26 and to cam the member G'' in a forward direction.

Referring to Fig. 2, it will be noted that in advance of the shoulder 36 and substantially at right angles thereto, a projection or ledge 37 is provided upon the lever 32, said projection or ledge having a straight edge adapted to engage the web 26 in the manner shown. The web 26 has an inner edge portion 38 located adjacent the lugs 34, and it is this portion 38 with which the projection 37 is adapted to make contact. The inner edge of web 26 engages the outer parts of lugs 34 for the purpose of supporting and guiding the member G''.

The throwout collar H is axially movable upon a fixed sleeve 39 embracing the shaft F and projecting forwardly from a plate 40 which positions the bearings 12, 12' and is fastened to the housing by means such as bolts 41. The throwout collar comprises an inner sleeve-like member 42 constructed of a suitable bearing metal and having mounted upon its exterior a ring member 43 and a second ring member 44. The ring member 44 has an inclined surface 45 adapted to make contact with the rollers 35 of the levers 32. Between the ring members 43 and 44 is interposed a washer 46. The ringer member 43 is fixed to the sleeve-like member 42 by means such as countersunk screws 47. The ring member 44 on the other hand is so mounted that it is free to turn relatively to the other parts of the throwout collar when contact is made between said ring member and the clutch releasing levers 32.

The throwout collar H is moved axially by means of a pivoted fork, said fork comprising a portion 48 of a rock shaft 49 extending transversely of the housing, and arm portions 50 fastened to the rock shaft. The arm portions 50 have notched free ends engaging pins 51 extending outwardly from the ring member 43. The lever I is, as will be understood, fastened to one end of the rock shaft 49 at one side of the housing.

For lubricating the bearing 12, 12', an oil duct 52 is provided in the plate 40, said duct having associated therewith a lubricating fitting 53. Lubrication of the pilot bearing 14 may be effected by the use of a lubricating fitting 54 carried at the rear end of the sleeve 31 and in communication with an axial lubricant duct 55 provided in the forward end portion of shaft F. The duct 55 leads to the recess 56 in the fly wheel in which the bearing 14 is received.

For limiting the movement of the throwout collar in opposite directions, the shifting fork has its arm portions 50 arranged to cooperate with suitable stops provided on the housing. In the engaged position of the clutch shown in Fig. 1, the lower ends of the arms 50 engage stop lugs 57 provided upon the housing. These stops prevent further rearward movement of the throwout collar. On the other hand, the forward movement of the throwout collar is limited by stop lugs 58 provided upon the housing, said lugs being engageable by the extremities 59 of stop screws 60 provided upon the upper ends of the arms 50.

In the position of Fig. 1, the clutch is maintained in engagement by the loading springs 30 which surround the spacers 19 and are under compression and press the member G'' rearwardly, said member G'' pulling the clutch plate G' rearwardly through the action of the spacers. In this position of the parts, a very strong frictional connection is maintained between the members E and G' on the one hand and the friction disk D on the other hand and thus the shaft F is driven very effectively. The levers 32 under such conditions rotate in a circular orbit, centrifugal force holding them in an angular position such as indicated in Fig. 1, with the shoulder 36 of each such lever in contact with the rear face of member G''. The levers rotating about the shaft have ample clearance between them and the throwout mechanism. The throwout mechanism is, of course, under the conditions stated, entirely at rest, there being no rotary movement in any part of it.

When it is desired to disengage the clutch, the lever I is shifted from the upright position shown in Fig. 1 to the inclined position shown in Fig. 3. This causes the throwout collar to be shifted forwardly, and as the inclined surface 45 of the contact ring moves forwardly in contact with the rollers 35, the levers 32 are shifted angularly, their rear extremities moving radially outward so as to cause the camming shoulders 36, by engaging the member G'', to thrust said member forwardly, overcoming the rearward pressure of the springs 30. As the member G'' moves forwardly, the forward ends of the spacers 19 move forwardly, thus disengaging G' from D and D in turn from E. Thus the clutch is fully released, and while the rotation of the friction disk D continues, the rotation of the clutch structure comprising the elements G', E, G" and 19 ceases and the shaft F ceases to rotate. It will be noted that in the fully disengaged position of Fig. 3, the throwout collar has been advanced to a position in which the rollers 35 are in contact with a cylindrical surface 45a adjacent the summit of the incline 45. In this position, the lever I is effectively held in a position in which the member G" is held in its disengaged position. In its forward movement, the member G" is effectively guided by the lugs projecting from the hub 31.

It will be observed that in the operation of disengaging the clutch, the throwout ring member 44 when moving forwardly but having no rotation, is moved into contact with the levers 32 when said levers are rotating at a fairly high speed, in other words, the engine speed. The throwout member 44 is, however, mounted so that it is free to rotate on its support 42, and as soon as member 44 makes contact with the levers 32, it commences to rotate as it moves forwardly. Thus there is no appreciable wear between the member 44 and the levers 32 during the time when they are in engagement with each other. This interengagement of 44 and 32 under the conditions just mentioned occupies a relatively short period of time for the reason that shortly after the disengagement of the friction surfaces, the rotation of the member carrying the cam levers ceases. This is a factor of considerable importance in reducing wear and reducing the number of wearing parts to a minimum. There is, of course, no appreciable wear between the rotatable member 44 and the angularly fixed sleeve member which supports it.

It is, of course, obvious how, when the throwout lever is moved from the position of Fig. 3 to the position of Fig. 1, the friction members of the clutch will be re-engaged.

The projection or ledge 37 on lever 32 has the function of limiting the radial inward movement of the rear extremity of the lever. This is of importance when the driven shaft is being driven at a relatively low speed. It will be apparent that when under such conditions the throwout collar is thrust forwardly, the roller 35 will be held in a position such that the inclined surface of shifting ring 44 will engage it properly.

It will be apparent that when the clutch is in the engaged position, the weight of the shifting lever is taken by the housing through the stops 57. In this position the lever is approximately vertical.

Ordinarily, adjustment of the interengaging parts of the clutch is not required but in the event that it is necessary to compensate for wear, this can be accomplished by placing thin washers under the castellated nuts 24. This is permitted by reason of the fact that the member G" can slide forwardly on the bolts or spacers 19 to a certain extent inasmuch as the body portions 19' of the bolts are so located as to permit this.

The friction plate G', in the operation of disengaging the clutch, is pushed forwardly by the member G" through a strong mechanical connection in order to provide effective disengagement.

In the event that it is necessary to replace the friction disk, this can be readily done by removing the housing section 11 together with the shaft F and the associated clutch parts, in which operation the friction disk will slide freely out of the driving ring C. The friction plate G' can then be removed from its bolts and a new friction disk submitted for the old one.

It will be seen from the foregoing that the invention provides a simple and accessible clutch structure involving a minimum number of wearing parts. Lubrication is effectively taken care of, as only two fittings are required, these being in accessible location within the housing where they will be kept clean. It is advantageous that the take-off shaft has special drilling for lubrication at the forward end only so that this shaft can be altered in length in the field without trouble. It is also advantageous to have the rock shaft located above the driven shaft rather than below it.

It is manifest that the friction clutch structure shown comprises a friction plate fixed on the driven shaft or what is usually the driven shaft, said plate being adapted for engagement at the front by a friction disk, such engagement being effected through an axially movable composite structure including as a part thereof a forwardly disposed friction plate adapted to engage the forward face of the friction disk and also including as a further part thereof a member which can be termed a presser member located rearwardly of the first-mentioned friction plate and having a mechanical connection as by spacer bolts with the second-mentioned friction plate. The driven member carries one or more camming members such as camming levers adapted to be engaged by a throwout collar for moving the presser member from the rear in the disengaging direction. It is also understood, of course, that the duplex clutch member G having the principal elements G' and G" is equipped with loading springs reacting against the axially fixed element E of the clutch structure and against the presser member G". These springs are shown as embracing the spacer members to which the members G' and G" are fastened, but this is not always essential. The axially movable member of the clutch organization, in another aspect, comprises the spacers having a clutch plate fastened to the forward ends thereof and having a pusher ring fastened to the rear ends thereof, the pusher ring being shifted by swinging camming elements, and the spacers referred to being guided by engagement intermediate of their ends in guiding apertures provided in the fixed member (E) of the clutch organization, and there being suitable spring loading means urging the spacers axially in a rearward direction.

Only one embodiment of the invention is shown in the drawings, but it will be understood that the invention can take various forms and that various changes in the organization of parts and in the details can be made without departing from the principles of the invention or the scope of the claims.

What I claim is:

1. In clutch mechanism of the spring loaded type in which one of the principal members includes an axially movable friction disk and the other principal member includes a pair of plate members between which said disk is clamped, one of said plate members being axially movable and the other being axially stationary, the combination, with the aforesaid members, of a presser element tied to the axially movable plate member and located at the remote side of the axially stationary plate member, loading springs interposed between said presser element and the axially stationary plate member, levers for shifting the presser element carried by the axially stationary plate member, throwout mechanism including an axially shiftable collar movable into and out of actuating contact with said levers, and means of engagement between said presser element and said levers for limiting the swinging of said levers.

2. In clutch mechanism, the combination of a driving member including an axially movable friction disk, a driven member including a shaft and a plate member fixed on said shaft against axial movement and having a forward friction face adapted to be contacted by said friction disk, an axially movable plate member located forwardly of said friction disk, a presser element for said movable plate member mechanically connected thereto and located rearwardly of the axially stationary plate member, and throwout mechanism cooperating with said presser element, said throwout mechanism including an axially movable collar and a plurality of camming levers adapted to be shifted by said collar, said collar having a body member held against rotation and a lever-contacting ring member mounted for rotation.

3. In clutch mechanism, the combination of a driving element including an axially movable friction disk, a driven member including a shaft and a plate member fixed to said shaft and having a friction surface opposed to the rear surface of said disk, an axially movable plate member opposed to the front surface of said disk, guide members having forward end portions fixed to said axially movable plate member, said members extending rearwardly through apertures in the other plate member, and means acting through the rear end portions of said guide members whereby the axially movable plate member is thrust forwardly for releasing the clutch, the clutch being spring loaded, and the means for effecting disengagement of the clutch including a presser member attached to the rear end portions of said guide members, the disengaging means also including camming levers swingably mounted on one of the clutch members and adapted to cam the presser member forwardly and controlled in their swinging movements by the presser member when the clutch is in the engaged position.

4. In clutch mechanism, the combination of a driving member including a friction disk, a driven member including a shaft and a plate member fixed to said shaft rearwardly of said disk, said plate member having a hub embracing said shaft, an axially movable plate member located forwardly of said disk and adapted to clamp the disk against said first plate member, a presser element mechanically connected to said second plate member and located rearwardly of the first plate member, levers carried by the rear end of said hub and having camming surfaces adapted to move said presser element forwardly to thereby release the clutch, said presser element being in the form of a ring embracing the rear portion of said hub member and having a rear face engageable by the levers, an axially movable throwout collar engageable with end portions of the levers, and an intermediately fulcrumed lever structure for shifting said collar, said lever structure in the engaged position of the clutch holding the collar out of contact with said first levers and being supported from a fixed part against movement in a clutch-releasing direction.

5. In clutch mechanism, the combination of a driving member including a friction disk, a driven member including a shaft and a plate member fixed to said shaft rearwardly of said disk, said plate member having a hub embracing said shaft, an axially movable plate member located forwardly of said disk and adapted to clamp the disk against said first plate member, a presser element mechanically connected to said second member and located rearwardly of the first plate member, levers carried by said first plate member rearwardly of said presser element and having camming surfaces adapted to move said presser element forwardly to thereby release the clutch and also having rearwardly extending free ends, an axially movable throwout collar, and operating means for said collar, said collar in the engaged position of the clutch being out of contact with said levers and having an independently rotatable part adapted to be moved into engagement with the free ends of said levers and to be thereby thrown into rotation when the clutch is being disengaged.

6. In clutch mechanism, the combination of a driven shaft, a plate member having a hub fixed to said shaft, a driving member forwardly of said plate member, friction means connected to the driving member and located forwardly of said plate member, an axially movable member engageable with said friction means to engage the clutch, clutch-operating means including a ring-like presser element at the rear of said plate member adapted to be shifted forwardly for releasing the clutch, levers carried by said plate member adapted to cam said presser element forwardly, an axially movable throwout collar for actuating said levers, and means of engagement between said levers and said presser element which limit the swinging movement of the levers when said plate member is rotated at low speed.

7. In clutch mechanism, the combination of a driven shaft, a plate member having a hub fixed to said shaft, a driving member forwardly of said plate member, friction means connected to the driving member and located forwardly of said plate member, an axially movable member engageable with said friction means to engage the clutch, clutch-operating means including a ring-like presser element at the rear of said plate member adapted to be shifted forwardly for releasing the clutch, levers carried by said plate member adapted to cam said presser element forwardly, an axially movable throwout collar for actuating said levers, and means of engagement between said levers and said presser element whereby the levers are held in proper position for making contact with the throwout collar when the clutch is in the engaged position and said plate member is rotated at low speed.

8. In clutch mechanism having two principal elements of which one includes an axially movable friction disk and the other includes a pair of disk clamping plate members of which one is axially stationary and the other capable of axial movement, the combination, with the aforesaid elements, of means including an axially movable presser element tied to the axially movable plate member and located at the remote side of the axially stationary plate member for shifting the axially movable plate member to releasing position, an axially movable collar adapted to contact said means for actuating it in clutch releasing direction, and a lever structure for shifting said collar having a terminal fork engaged with said collar to move it in opposite directions and having a fulcrum intermediate of the ends of the lever structure, said lever structure in the engaged position of the clutch holding the collar out of contact with said first means and being supported from a fixed part against movement in a clutch-releasing direction.

ARTHUR T. NABSTEDT.

REFERENCES CITED

The following references are of record in the file of this patent:

UNITED STATES PATENTS

| Number | Name | Date |
|---|---|---|
| 810,783 | Maxwell | Jan. 23, 1906 |
| 1,189,176 | Price | June 27, 1916 |
| 1,407,384 | Crowley | Feb. 21, 1922 |
| 1,464,173 | Fawick | Aug. 7, 1923 |
| 1,985,422 | Pearmain | Dec. 25, 1934 |
| 2,162,071 | Eason | June 13, 1939 |
| 2,177,362 | Eason | Oct. 24, 1939 |
| 2,184,506 | Eason | Dec. 26, 1939 |
| 2,334,382 | Carlson | Nov. 16, 1943 |

FOREIGN PATENTS

| Number | Country | Date |
|---|---|---|
| 179,256 | Germany | Dec. 5, 1906 |
| 316,554 | Italy | Sept. 16, 1933 |